(12) United States Patent
Egan et al.

(10) Patent No.: US 9,287,727 B1
(45) Date of Patent: Mar. 15, 2016

(54) TEMPORAL VOLTAGE ADAPTIVE LITHIUM BATTERY CHARGER

(71) Applicant: ICONTROL NETWORKS, INC., Redwood City, CA (US)

(72) Inventors: Ken Egan, Austin, TX (US); Jim Kitchen, Austin, TX (US)

(73) Assignee: iControl Networks, Inc., Redwood City, CA (US)

( * ) Notice: Subject to any disclaimer, the term of this patent is extended or adjusted under 35 U.S.C. 154(b) by 61 days.

(21) Appl. No.: 14/204,628

(22) Filed: Mar. 11, 2014

Related U.S. Application Data

(60) Provisional application No. 61/788,473, filed on Mar. 15, 2013.

(51) Int. Cl.
*H01M 10/46* (2006.01)
*H02J 7/00* (2006.01)

(52) U.S. Cl.
CPC .............. *H02J 7/0029* (2013.01); *H02J 7/007* (2013.01); *H02J 2007/0037* (2013.01)

(58) Field of Classification Search
CPC ............ H02J 7/0065; H02J 7/04; H02J 7/045
USPC ......... 320/128, 137, 157, 158, 159, 162, 163, 320/164
See application file for complete search history.

(56) References Cited

U.S. PATENT DOCUMENTS

| 686,838 | A | 11/1901 | Appel |
|---|---|---|---|
| 4,141,006 | A | 2/1979 | Braxton |
| 4,257,038 | A | 3/1981 | Rounds et al. |
| 4,363,031 | A | 12/1982 | Reinowitz |
| 4,520,503 | A | 5/1985 | Kirst et al. |
| 4,559,526 | A | 12/1985 | Tani et al. |
| 4,574,305 | A | 3/1986 | Campbell et al. |
| 4,581,606 | A | 4/1986 | Mallory |
| D284,084 | S | 6/1986 | Ferrara, Jr. |
| 4,641,127 | A | 2/1987 | Hogan et al. |
| 4,652,859 | A | 3/1987 | Van Wienen |
| 4,694,282 | A | 9/1987 | Tamura et al. |
| 4,730,184 | A | 3/1988 | Bach |

(Continued)

FOREIGN PATENT DOCUMENTS

| AU | 2005223267 B2 | 12/2010 |
|---|---|---|
| AU | 2010297957 A1 | 5/2012 |

(Continued)

OTHER PUBLICATIONS

Alarm.com—Interactive Security Systems, Elders [retrieved on Nov. 4, 2003], 1 page.

(Continued)

*Primary Examiner* — Edward Tso
(74) *Attorney, Agent, or Firm* — IPR Law Group, PC

(57) ABSTRACT

Systems and methods comprise setting a digital-to-analog converter of a charger to a set voltage. The set voltage is a maximum voltage allowable for a battery type. An output voltage of the charger is determined when the charger is operating at the set voltage. An offset voltage is determined by comparing the output voltage to the set voltage. A cutoff voltage of a battery is determined using the offset voltage and the open circuit voltage. Charger voltage is adaptively adjusted in response to the cutoff voltage, and the adjusting prevents an over potential to the battery.

1 Claim, 1 Drawing Sheet

(56) References Cited

U.S. PATENT DOCUMENTS

| | | | |
|---|---|---|---|
| 4,754,261 A | 6/1988 | Marino |
| 4,779,007 A | 10/1988 | Schlanger et al. |
| 4,801,924 A | 1/1989 | Burgmann et al. |
| 4,812,820 A | 3/1989 | Chatwin |
| 4,833,449 A | 5/1989 | Gaffigan |
| 4,855,713 A | 8/1989 | Brunius |
| 4,860,185 A | 8/1989 | Brewer et al. |
| 4,897,630 A | 1/1990 | Nykerk |
| 4,918,623 A | 4/1990 | Lockitt et al. |
| 4,951,029 A | 8/1990 | Severson |
| 4,959,713 A | 9/1990 | Morotomi et al. |
| 4,993,059 A | 2/1991 | Smith et al. |
| 4,994,787 A | 2/1991 | Kratt et al. |
| 5,023,901 A | 6/1991 | Sloan et al. |
| 5,086,385 A | 2/1992 | Launey et al. |
| 5,091,780 A | 2/1992 | Pomerleau |
| 5,132,968 A | 7/1992 | Cephus |
| 5,134,644 A | 7/1992 | Garton et al. |
| 5,159,315 A | 10/1992 | Schultz et al. |
| 5,160,879 A | 11/1992 | Tortola et al. |
| D337,569 S | 7/1993 | Kando |
| 5,227,776 A | 7/1993 | Starefoss |
| 5,237,305 A | 8/1993 | Ishikuro et al. |
| 5,319,394 A | 6/1994 | Dukek |
| 5,319,698 A | 6/1994 | Glidewell et al. |
| 5,334,974 A | 8/1994 | Simms et al. |
| 5,438,607 A | 8/1995 | Przygoda, Jr. et al. |
| 5,446,445 A | 8/1995 | Bloomfield et al. |
| 5,465,081 A | 11/1995 | Todd |
| 5,471,194 A | 11/1995 | Guscott |
| 5,486,812 A | 1/1996 | Todd |
| 5,499,014 A | 3/1996 | Greenwaldt |
| 5,499,196 A | 3/1996 | Pacheco |
| 5,519,878 A | 5/1996 | Dolin, Jr. |
| 5,578,989 A | 11/1996 | Pedtke |
| 5,579,197 A | 11/1996 | Mengelt et al. |
| D377,034 S | 12/1996 | Matsushita |
| 5,587,705 A | 12/1996 | Morris |
| 5,598,086 A * | 1/1997 | Somerville ........... 320/148 |
| 5,623,601 A | 4/1997 | Vu |
| 5,625,338 A | 4/1997 | Pildner et al. |
| 5,630,216 A | 5/1997 | McEwan |
| 5,651,070 A | 7/1997 | Blunt |
| D389,501 S | 1/1998 | Mascarenas, Sr. et al. |
| 5,715,394 A | 2/1998 | Jabs |
| 5,717,379 A | 2/1998 | Peters |
| 5,717,578 A | 2/1998 | Afzal |
| 5,731,756 A | 3/1998 | Roddy |
| 5,777,551 A | 7/1998 | Hess |
| 5,874,952 A | 2/1999 | Morgan |
| 5,886,894 A | 3/1999 | Rakoff |
| 5,892,442 A | 4/1999 | Ozery |
| 5,907,279 A | 5/1999 | Bruins et al. |
| 5,909,183 A | 6/1999 | Borgstahl et al. |
| 5,914,655 A | 6/1999 | Clifton et al. |
| 5,943,394 A | 8/1999 | Ader et al. |
| 5,952,815 A * | 9/1999 | Rouillard et al. ............ 320/116 |
| 5,955,946 A | 9/1999 | Beheshti et al. |
| 5,958,053 A | 9/1999 | Denker |
| 5,959,528 A | 9/1999 | Right et al. |
| 5,963,916 A | 10/1999 | Kaplan |
| D416,910 S | 11/1999 | Vasquez |
| 5,991,795 A | 11/1999 | Howard et al. |
| 6,032,036 A | 2/2000 | Maystre et al. |
| 6,037,991 A | 3/2000 | Thro et al. |
| 6,038,289 A | 3/2000 | Sands |
| 6,040,770 A | 3/2000 | Britton |
| 6,049,272 A | 4/2000 | Lee et al. |
| 6,049,273 A | 4/2000 | Hess |
| 6,052,052 A | 4/2000 | Delmonaco |
| 6,060,994 A | 5/2000 | Chen |
| 6,067,346 A | 5/2000 | Akhteruzzaman et al. |
| 6,067,440 A | 5/2000 | Diefes |
| 6,078,253 A | 6/2000 | Fowler |
| 6,078,257 A | 6/2000 | Ferraro |
| 6,085,030 A | 7/2000 | Whitehead et al. |
| 6,104,785 A | 8/2000 | Chen |
| 6,134,591 A | 10/2000 | Nickles |
| 6,138,249 A | 10/2000 | Nolet |
| 6,140,987 A | 10/2000 | Stein et al. |
| 6,181,341 B1 | 1/2001 | Shinagawa |
| 6,192,418 B1 | 2/2001 | Hale et al. |
| 6,198,475 B1 | 3/2001 | Kunimatsu et al. |
| 6,198,479 B1 | 3/2001 | Humpleman et al. |
| 6,208,247 B1 | 3/2001 | Agre et al. |
| 6,211,783 B1 | 4/2001 | Wang |
| 6,219,677 B1 | 4/2001 | Howard |
| 6,246,320 B1 | 6/2001 | Monroe |
| 6,271,752 B1 | 8/2001 | Vaios |
| 6,281,790 B1 | 8/2001 | Kimmel et al. |
| 6,282,569 B1 | 8/2001 | Wallis et al. |
| 6,286,038 B1 | 9/2001 | Reichmeyer et al. |
| 6,288,716 B1 | 9/2001 | Humpleman et al. |
| 6,289,382 B1 | 9/2001 | Bowman-Amuah |
| 6,295,346 B1 | 9/2001 | Markowitz et al. |
| 6,320,506 B1 | 11/2001 | Ferraro |
| D451,529 S | 12/2001 | Vasquez |
| 6,331,122 B1 | 12/2001 | Wu |
| 6,351,829 B1 | 2/2002 | Dupont et al. |
| 6,353,891 B1 | 3/2002 | Borella et al. |
| 6,363,417 B1 | 3/2002 | Howard et al. |
| 6,363,422 B1 | 3/2002 | Hunter et al. |
| 6,369,695 B1 | 4/2002 | Horon |
| 6,369,705 B1 | 4/2002 | Kennedy |
| 6,370,436 B1 | 4/2002 | Howard et al. |
| 6,374,079 B1 | 4/2002 | Hsu |
| 6,377,861 B1 | 4/2002 | York |
| 6,385,772 B1 | 5/2002 | Courtney |
| 6,400,265 B1 | 6/2002 | Saylor et al. |
| D460,472 S | 7/2002 | Wang |
| 6,418,037 B1 | 7/2002 | Zhang |
| 6,433,683 B1 | 8/2002 | Robinson |
| D464,328 S | 10/2002 | Vasquez et al. |
| D464,948 S | 10/2002 | Vasquez et al. |
| 6,462,507 B2 | 10/2002 | Fisher et al. |
| 6,462,663 B1 | 10/2002 | Wilson et al. |
| 6,467,084 B1 | 10/2002 | Howard et al. |
| 6,480,901 B1 | 11/2002 | Weber et al. |
| 6,493,020 B1 | 12/2002 | Stevenson et al. |
| 6,496,927 B1 | 12/2002 | McGrane et al. |
| 6,529,723 B1 | 3/2003 | Bentley |
| 6,542,075 B2 | 4/2003 | Barker et al. |
| 6,553,336 B1 | 4/2003 | Johnson et al. |
| 6,563,800 B1 | 5/2003 | Salo et al. |
| 6,574,234 B1 | 6/2003 | Myer et al. |
| 6,580,950 B1 | 6/2003 | Johnson et al. |
| 6,587,455 B1 | 7/2003 | Ray et al. |
| 6,587,736 B2 | 7/2003 | Howard et al. |
| 6,591,094 B1 | 7/2003 | Bentley |
| 6,597,703 B1 | 7/2003 | Li et al. |
| 6,601,086 B1 | 7/2003 | Howard et al. |
| 6,603,488 B2 | 8/2003 | Humpleman et al. |
| 6,609,127 B1 | 8/2003 | Lee et al. |
| 6,615,088 B1 | 9/2003 | Myer et al. |
| 6,621,827 B1 | 9/2003 | Rezvani et al. |
| 6,624,750 B1 | 9/2003 | Marman et al. |
| 6,631,416 B2 | 10/2003 | Bendinelli et al. |
| 6,636,893 B1 | 10/2003 | Fong |
| 6,643,652 B2 | 11/2003 | Helgeson et al. |
| 6,643,669 B1 | 11/2003 | Novak et al. |
| 6,648,682 B1 | 11/2003 | Wu |
| 6,658,091 B1 | 12/2003 | Naidoo et al. |
| 6,661,340 B1 | 12/2003 | Saylor et al. |
| 6,686,838 B1 | 2/2004 | Rezvani et al. |
| 6,690,411 B2 | 2/2004 | Naidoo et al. |
| 6,693,530 B1 | 2/2004 | Dowens et al. |
| 6,693,545 B2 | 2/2004 | Brown et al. |
| 6,697,103 B1 | 2/2004 | Fernandez et al. |
| 6,704,786 B1 | 3/2004 | Gupta et al. |
| 6,721,689 B2 | 4/2004 | Markle et al. |
| 6,721,747 B2 | 4/2004 | Lipkin |
| 6,738,824 B1 | 5/2004 | Blair |
| 6,754,717 B1 | 6/2004 | Day, III et al. |
| 6,756,896 B2 | 6/2004 | Ford |

(56) References Cited

U.S. PATENT DOCUMENTS

| | | |
|---|---|---|
| 6,756,998 B1 | 6/2004 | Bilger |
| 6,762,686 B1 | 7/2004 | Tabe |
| 6,778,085 B2 | 8/2004 | Faulkner et al. |
| 6,781,509 B1 | 8/2004 | Oppedahl et al. |
| 6,785,542 B1 | 8/2004 | Blight et al. |
| 6,789,147 B1 | 9/2004 | Kessler et al. |
| 6,795,322 B2 | 9/2004 | Aihara et al. |
| 6,798,344 B2 | 9/2004 | Faulkner et al. |
| 6,810,409 B1 | 10/2004 | Fry et al. |
| 6,826,233 B1 | 11/2004 | Oosawa |
| 6,850,252 B1 | 2/2005 | Hoffberg |
| 6,856,236 B2 | 2/2005 | Christensen et al. |
| 6,865,690 B2 | 3/2005 | Kocin |
| 6,873,256 B2 | 3/2005 | Lemelson et al. |
| D504,889 S | 5/2005 | Andre et al. |
| 6,891,838 B1 | 5/2005 | Petite et al. |
| 6,912,429 B1 | 6/2005 | Bilger |
| 6,918,112 B2 | 7/2005 | Bourke-Dunphy et al. |
| 6,928,148 B2 | 8/2005 | Simon et al. |
| 6,930,599 B2 | 8/2005 | Naidoo et al. |
| 6,930,730 B2 | 8/2005 | Maxson et al. |
| 6,931,445 B2 | 8/2005 | Davis |
| 6,943,681 B2 | 9/2005 | Rezvani et al. |
| 6,956,477 B2 | 10/2005 | Chun |
| 6,959,341 B1 | 10/2005 | Leung |
| 6,959,393 B2 | 10/2005 | Hollis et al. |
| 6,963,981 B1 | 11/2005 | Bailey et al. |
| 6,965,313 B1 | 11/2005 | Saylor et al. |
| 6,970,183 B1 | 11/2005 | Monroe |
| 6,972,676 B1 | 12/2005 | Kimmel et al. |
| 6,975,220 B1 | 12/2005 | Foodman et al. |
| 6,977,485 B1 | 12/2005 | Wei |
| 6,990,591 B1 | 1/2006 | Pearson |
| 7,015,806 B2 | 3/2006 | Naidoo et al. |
| 7,016,970 B2 | 3/2006 | Harumoto et al. |
| 7,020,697 B1 | 3/2006 | Goodman et al. |
| 7,020,701 B1 | 3/2006 | Gelvin et al. |
| 7,024,676 B1 | 4/2006 | Klopfenstein |
| 7,030,752 B2 | 4/2006 | Tyroler |
| 7,032,002 B1 | 4/2006 | Rezvani et al. |
| 7,034,681 B2 | 4/2006 | Yamamoto et al. |
| 7,035,907 B1 | 4/2006 | Decasper et al. |
| 7,039,391 B2 | 5/2006 | Rezvani et al. |
| 7,043,537 B1 | 5/2006 | Pratt |
| 7,047,088 B2 | 5/2006 | Nakamura et al. |
| 7,047,092 B2 | 5/2006 | Wimsatt |
| 7,053,764 B2 | 5/2006 | Stilp |
| 7,072,934 B2 | 7/2006 | Helgeson et al. |
| 7,075,429 B2 | 7/2006 | Marshall |
| 7,079,020 B2 | 7/2006 | Stilp |
| 7,080,046 B1 | 7/2006 | Rezvani et al. |
| 7,081,813 B2 | 7/2006 | Winick et al. |
| 7,082,460 B2 | 7/2006 | Hansen et al. |
| 7,085,937 B1 | 8/2006 | Rezvani et al. |
| 7,099,944 B1 | 8/2006 | Anschutz et al. |
| 7,099,994 B2 | 8/2006 | Thayer et al. |
| 7,103,152 B2 | 9/2006 | Naidoo et al. |
| 7,106,176 B2 | 9/2006 | La et al. |
| 7,107,322 B1 | 9/2006 | Freeny, Jr. |
| 7,110,774 B1 | 9/2006 | Davis et al. |
| 7,113,090 B1 | 9/2006 | Saylor et al. |
| 7,113,099 B2 | 9/2006 | Tyroler et al. |
| 7,114,554 B2 | 10/2006 | Bergman et al. |
| 7,119,674 B2 | 10/2006 | Sefton |
| 7,120,232 B2 | 10/2006 | Naidoo et al. |
| 7,120,233 B2 | 10/2006 | Naidoo et al. |
| 7,130,383 B2 | 10/2006 | Naidoo et al. |
| 7,130,585 B1 | 10/2006 | Ollis et al. |
| 7,148,810 B2 | 12/2006 | Bhat |
| 7,149,798 B2 | 12/2006 | Rezvani et al. |
| 7,149,814 B2 | 12/2006 | Neufeld et al. |
| 7,164,907 B2 | 1/2007 | Cochran et al. |
| 7,166,987 B2 | 1/2007 | Lee et al. |
| 7,174,564 B1 | 2/2007 | Weatherspoon et al. |
| 7,183,907 B2 | 2/2007 | Simon et al. |
| 7,203,486 B2 | 4/2007 | Patel |
| 7,209,945 B2 | 4/2007 | Hicks et al. |
| 7,212,570 B2 | 5/2007 | Akiyama et |
| 7,218,217 B2 | 5/2007 | Adonailo et al. |
| 7,222,359 B2 | 5/2007 | Freund et al. |
| 7,237,267 B2 | 6/2007 | Rayes et al. |
| 7,248,161 B2 | 7/2007 | Spoltore et al. |
| 7,249,317 B1 | 7/2007 | Nakagawa et al. |
| 7,250,854 B2 | 7/2007 | Rezvani et al. |
| 7,250,859 B2 | 7/2007 | Martin et al. |
| 7,254,779 B1 | 8/2007 | Rezvani et al. |
| 7,262,690 B2 | 8/2007 | Heaton et al. |
| 7,298,253 B2 | 11/2007 | Petricoin et al. |
| 7,305,461 B2 | 12/2007 | Ullman |
| 7,310,115 B2 | 12/2007 | Tanimoto |
| 7,313,102 B2 | 12/2007 | Stephenson et al. |
| D558,460 S | 1/2008 | Yu et al. |
| D558,756 S | 1/2008 | Andre et al. |
| 7,337,217 B2 | 2/2008 | Wang |
| 7,337,473 B2 | 2/2008 | Chang et al. |
| 7,343,619 B2 | 3/2008 | Ofek et al. |
| 7,349,761 B1 | 3/2008 | Cruse |
| 7,349,967 B2 | 3/2008 | Wang |
| 7,367,045 B2 | 4/2008 | Ofek et al. |
| 7,370,115 B2 | 5/2008 | Bae et al. |
| 7,383,339 B1 | 6/2008 | Meenan et al. |
| 7,403,838 B2 | 7/2008 | Deen et al. |
| 7,409,045 B2 | 8/2008 | Naidoo et al. |
| 7,409,451 B1 | 8/2008 | Meenan et al. |
| 7,412,447 B2 | 8/2008 | Hilbert et al. |
| 7,425,101 B2 | 9/2008 | Cheng |
| 7,428,585 B1 | 9/2008 | Owens, II et al. |
| 7,430,614 B2 | 9/2008 | Shen et al. |
| 7,437,753 B2 | 10/2008 | Nahum |
| 7,440,434 B2 | 10/2008 | Chaskar et al. |
| 7,457,869 B2 | 11/2008 | Kernan |
| 7,469,139 B2 | 12/2008 | van De Groenendaal |
| 7,469,294 B1 | 12/2008 | Luo et al. |
| 7,469,381 B2 | 12/2008 | Ording |
| D584,738 S | 1/2009 | Kim et al. |
| D585,399 S | 1/2009 | Hwang |
| 7,479,949 B2 | 1/2009 | Jobs et al. |
| 7,480,713 B2 | 1/2009 | Ullman |
| 7,480,724 B2 | 1/2009 | Zimler et al. |
| 7,498,695 B2 | 3/2009 | Gaudreau et al. |
| 7,506,052 B2 | 3/2009 | Qian et al. |
| 7,509,687 B2 | 3/2009 | Ofek et al. |
| 7,511,614 B2 | 3/2009 | Stilp et al. |
| 7,512,965 B1 | 3/2009 | Amdur et al. |
| 7,526,539 B1 | 4/2009 | Hsu |
| 7,526,762 B1 | 4/2009 | Astala et al. |
| 7,528,723 B2 | 5/2009 | Fast et al. |
| 7,551,071 B2 | 6/2009 | Bennett, III et al. |
| 7,554,934 B2 | 6/2009 | Abraham et al. |
| 7,558,379 B2 | 7/2009 | Winick |
| 7,568,018 B1 | 7/2009 | Hove et al. |
| 7,571,459 B2 | 8/2009 | Ganesh et al. |
| 7,577,420 B2 | 8/2009 | Srinivasan et al. |
| 7,587,464 B2 | 9/2009 | Moorer et al. |
| D602,014 S | 10/2009 | Andre et al. |
| D602,015 S | 10/2009 | Andre et al. |
| D602,017 S | 10/2009 | Andre et al. |
| D602,486 S | 10/2009 | Andre et al. |
| D602,487 S | 10/2009 | Maskatia |
| 7,619,512 B2 | 11/2009 | Trundle et al. |
| 7,620,427 B2 | 11/2009 | Shanahan |
| 7,627,665 B2 | 12/2009 | Barker et al. |
| 7,633,385 B2 | 12/2009 | Cohn et al. |
| 7,634,519 B2 | 12/2009 | Creamer et al. |
| 7,651,530 B2 | 1/2010 | Winick |
| 7,653,911 B2 | 1/2010 | Doshi et al. |
| 7,681,201 B2 | 3/2010 | Dale et al. |
| 7,697,028 B1 | 4/2010 | Johnson |
| 7,701,970 B2 | 4/2010 | Krits et al. |
| D615,083 S | 5/2010 | Andre et al. |
| 7,711,796 B2 | 5/2010 | Gutt et al. |
| 7,734,020 B2 | 6/2010 | Elliot et al. |
| 7,734,286 B2 | 6/2010 | Almeda et al. |
| 7,734,906 B2 | 6/2010 | Orlando et al. |

(56) References Cited

U.S. PATENT DOCUMENTS

| | | |
|---|---|---|
| 7,739,596 B2 | 6/2010 | Clarke-Martin et al. |
| 7,751,409 B1 | 7/2010 | Carolan |
| 7,787,863 B2 | 8/2010 | Groenendaal |
| D624,896 S | 10/2010 | Park et al. |
| D626,437 S | 11/2010 | Lee et al. |
| 7,827,252 B2 | 11/2010 | Hopmann et al. |
| 7,855,635 B2 | 12/2010 | Cohn et al. |
| 7,859,404 B2 | 12/2010 | Chul Lee et al. |
| 7,882,537 B2 | 2/2011 | Okajo et al. |
| 7,884,855 B2 | 2/2011 | Ortiz |
| 7,890,612 B2 | 2/2011 | Todd et al. |
| 7,911,341 B2 | 3/2011 | Raji et al. |
| D636,769 S | 4/2011 | Wood et al. |
| 7,921,686 B2 | 4/2011 | Bagepalli et al. |
| D637,596 S | 5/2011 | Akana et al. |
| D639,805 S | 6/2011 | Song et al. |
| D640,663 S | 6/2011 | Arnholt et al. |
| 7,956,736 B2 | 6/2011 | Cohn et al. |
| 7,970,863 B1 | 6/2011 | Fontaine |
| D641,018 S | 7/2011 | Lee et al. |
| 7,974,235 B2 | 7/2011 | Ghozati et al. |
| D642,563 S | 8/2011 | Akana et al. |
| 8,001,219 B2 | 8/2011 | Moorer et al. |
| D645,015 S | 9/2011 | Lee et al. |
| D645,435 S | 9/2011 | Kim et al. |
| D645,833 S | 9/2011 | Seflic et al. |
| 8,022,833 B2 | 9/2011 | Cho |
| 8,028,041 B2 | 9/2011 | Olliphant et al. |
| 8,042,049 B2 | 10/2011 | Killian et al. |
| 8,046,411 B2 | 10/2011 | Hayashi et al. |
| D650,381 S | 12/2011 | Park et al. |
| 8,073,931 B2 | 12/2011 | Dawes et al. |
| 8,086,702 B2 | 12/2011 | Baum et al. |
| 8,086,703 B2 | 12/2011 | Baum et al. |
| D654,460 S | 2/2012 | Kim et al. |
| D654,497 S | 2/2012 | Lee |
| 8,122,131 B2 | 2/2012 | Baum et al. |
| 8,125,184 B2 | 2/2012 | Raji et al. |
| D656,137 S | 3/2012 | Chung et al. |
| 8,140,658 B1 | 3/2012 | Gelvin et al. |
| 8,159,519 B2 | 4/2012 | Kurtz et al. |
| 8,200,827 B1 | 6/2012 | Hunyady et al. |
| 8,209,400 B2 | 6/2012 | Baum et al. |
| D663,298 S | 7/2012 | Song et al. |
| D664,540 S | 7/2012 | Kim et al. |
| 8,214,496 B2 | 7/2012 | Gutt et al. |
| D664,954 S | 8/2012 | Kim et al. |
| D666,198 S | 8/2012 | Van Den Nieuwenhuizen et al. |
| 8,239,477 B2 | 8/2012 | Sharma et al. |
| D667,395 S | 9/2012 | Lee |
| D667,396 S | 9/2012 | Koh |
| D667,397 S | 9/2012 | Koh |
| D667,398 S | 9/2012 | Koh |
| D667,399 S | 9/2012 | Koh |
| 8,269,623 B2 | 9/2012 | Addy |
| D668,650 S | 10/2012 | Han |
| D668,651 S | 10/2012 | Kim et al. |
| D668,652 S | 10/2012 | Kim et al. |
| D669,469 S | 10/2012 | Kang |
| D670,692 S | 11/2012 | Akana et al. |
| D671,514 S | 11/2012 | Kim et al. |
| 8,311,526 B2 | 11/2012 | Forstall et al. |
| D671,938 S | 12/2012 | Hsu et al. |
| D672,344 S | 12/2012 | Li |
| D672,345 S | 12/2012 | Li |
| D672,739 S | 12/2012 | Sin |
| D672,768 S | 12/2012 | Huang et al. |
| 8,335,842 B2 | 12/2012 | Raji et al. |
| 8,335,854 B2 | 12/2012 | Eldering |
| D673,561 S | 1/2013 | Hyun et al. |
| D673,948 S | 1/2013 | Andre et al. |
| D673,950 S | 1/2013 | Li et al. |
| D674,369 S | 1/2013 | Jaewoong |
| D675,203 S | 1/2013 | Yang |
| D675,588 S | 2/2013 | Park |
| D675,612 S | 2/2013 | Andre et al. |
| D676,443 S | 2/2013 | Canizares et al. |
| D676,819 S | 2/2013 | Choi |
| D677,255 S | 3/2013 | McManigal et al. |
| D677,640 S | 3/2013 | Kim et al. |
| D677,659 S | 3/2013 | Akana et al. |
| D677,660 S | 3/2013 | Groene et al. |
| D678,271 S | 3/2013 | Chiu |
| D678,272 S | 3/2013 | Groene et al. |
| D678,877 S | 3/2013 | Groene et al. |
| D679,706 S | 4/2013 | Tang et al. |
| D680,151 S | 4/2013 | Katori |
| D680,524 S | 4/2013 | Feng et al. |
| D681,032 S | 4/2013 | Akana et al. |
| D681,583 S | 5/2013 | Park |
| D681,591 S | 5/2013 | Sung |
| D681,632 S | 5/2013 | Akana et al. |
| D682,239 S | 5/2013 | Yeh et al. |
| 8,451,986 B2 | 5/2013 | Cohn et al. |
| D684,553 S | 6/2013 | Kim et al. |
| D684,968 S | 6/2013 | Smith et al. |
| 8,473,619 B2 | 6/2013 | Baum et al. |
| D685,778 S | 7/2013 | Fahrendorff et al. |
| D685,783 S | 7/2013 | Bryan et al. |
| 8,478,844 B2 | 7/2013 | Baum et al. |
| 8,478,871 B2 | 7/2013 | Gutt et al. |
| 8,483,853 B1 | 7/2013 | Lambourne |
| 8,499,038 B1 | 7/2013 | Vucurevich |
| 8,520,068 B2 | 8/2013 | Naidoo et al. |
| 8,525,664 B2 | 9/2013 | Hadizad et al. |
| 8,543,665 B2 | 9/2013 | Ansari et al. |
| 8,584,199 B1 | 11/2013 | Chen et al. |
| 8,612,591 B2 | 12/2013 | Dawes et al. |
| 8,675,071 B1 | 3/2014 | Slavin et al. |
| 8,730,834 B2 | 5/2014 | Marusca et al. |
| 8,836,467 B1 | 9/2014 | Cohn et al. |
| 8,902,740 B2 | 12/2014 | Hicks, III |
| 8,914,526 B1 | 12/2014 | Lindquist et al. |
| 8,935,236 B2 | 1/2015 | Morita et al. |
| 2001/0016501 A1 | 8/2001 | King |
| 2001/0030597 A1 | 10/2001 | Inoue et al. |
| 2001/0034754 A1 | 10/2001 | Elwahab et al. |
| 2002/0004828 A1 | 1/2002 | Davis et al. |
| 2002/0026476 A1 | 2/2002 | Miyazaki et al. |
| 2002/0026531 A1 | 2/2002 | Keane et al. |
| 2002/0027504 A1 | 3/2002 | Davis et al. |
| 2002/0029276 A1 | 3/2002 | Bendinelli et al. |
| 2002/0038380 A1 | 3/2002 | Brawn et al. |
| 2002/0052913 A1 | 5/2002 | Yamada et al. |
| 2002/0059637 A1 | 5/2002 | Rakib |
| 2002/0083342 A1 | 6/2002 | Webb et al. |
| 2002/0095490 A1 | 7/2002 | Barker et al. |
| 2002/0099809 A1 | 7/2002 | Lee |
| 2002/0099829 A1 | 7/2002 | Richards et al. |
| 2002/0103898 A1 | 8/2002 | Moyer et al. |
| 2002/0103927 A1 | 8/2002 | Parent |
| 2002/0107910 A1 | 8/2002 | Zhao |
| 2002/0109580 A1 | 8/2002 | Shreve et al. |
| 2002/0111698 A1 | 8/2002 | Graziano et al. |
| 2002/0112051 A1 | 8/2002 | Ullman |
| 2002/0112182 A1 | 8/2002 | Chang et al. |
| 2002/0114439 A1 | 8/2002 | Dunlap |
| 2002/0116117 A1 | 8/2002 | Martens et al. |
| 2002/0118107 A1 | 8/2002 | Yamamoto et al. |
| 2002/0120790 A1 | 8/2002 | Schwalb |
| 2002/0128728 A1 | 9/2002 | Murakami et al. |
| 2002/0133539 A1 | 9/2002 | Monday |
| 2002/0133578 A1 | 9/2002 | Wu |
| 2002/0143923 A1 | 10/2002 | Alexander |
| 2002/0147982 A1 | 10/2002 | Naidoo et al. |
| 2002/0156564 A1 | 10/2002 | Preston et al. |
| 2002/0163534 A1 | 11/2002 | Choi et al. |
| 2002/0163997 A1 | 11/2002 | Bergman et al. |
| 2002/0165006 A1 | 11/2002 | Haller et al. |
| 2002/0174367 A1 | 11/2002 | Kimmel et al. |
| 2002/0177428 A1 | 11/2002 | Menard et al. |
| 2002/0180579 A1 | 12/2002 | Nagaoka et al. |
| 2002/0184301 A1 | 12/2002 | Parent |
| 2003/0005030 A1 | 1/2003 | Sutton et al. |

(56) References Cited

U.S. PATENT DOCUMENTS

| | | |
|---|---|---|
| 2003/0009552 A1 | 1/2003 | Benfield et al. |
| 2003/0009553 A1 | 1/2003 | Benfield et al. |
| 2003/0023839 A1 | 1/2003 | Burkhardt et al. |
| 2003/0030548 A1 | 2/2003 | Kovacs et al. |
| 2003/0038849 A1 | 2/2003 | Craven et al. |
| 2003/0041137 A1 | 2/2003 | Horie et al. |
| 2003/0041167 A1 | 2/2003 | French et al. |
| 2003/0051009 A1 | 3/2003 | Shah et al. |
| 2003/0052923 A1 | 3/2003 | Porter |
| 2003/0061344 A1 | 3/2003 | Monroe |
| 2003/0062997 A1 | 4/2003 | Naidoo et al. |
| 2003/0065757 A1 | 4/2003 | Mentze et al. |
| 2003/0071724 A1 | 4/2003 | D'Amico |
| 2003/0090473 A1 | 5/2003 | Joshi |
| 2003/0103088 A1 | 6/2003 | Dresti et al. |
| 2003/0115345 A1 | 6/2003 | Chien et al. |
| 2003/0128115 A1 | 7/2003 | Giacopelli et al. |
| 2003/0132018 A1 | 7/2003 | Okita et al. |
| 2003/0137426 A1 | 7/2003 | Anthony et al. |
| 2003/0147534 A1 | 8/2003 | Ablay et al. |
| 2003/0158635 A1 | 8/2003 | Pillar et al. |
| 2003/0159135 A1 | 8/2003 | Hiller et al. |
| 2003/0174648 A1 | 9/2003 | Wang et al. |
| 2003/0177236 A1 | 9/2003 | Goto et al. |
| 2003/0182396 A1 | 9/2003 | Reich et al. |
| 2003/0187920 A1 | 10/2003 | Redkar |
| 2003/0189509 A1 | 10/2003 | Hayes et al. |
| 2003/0197847 A1 | 10/2003 | Shinoda |
| 2003/0200325 A1 | 10/2003 | Krishnaswamy et al. |
| 2003/0201889 A1 | 10/2003 | Zulkowski |
| 2003/0210126 A1 | 11/2003 | Kanazawa |
| 2003/0217136 A1 | 11/2003 | Cho et al. |
| 2003/0230934 A1 | 12/2003 | Cordelli et al. |
| 2003/0236841 A1 | 12/2003 | Epshteyn |
| 2004/0003241 A1 | 1/2004 | Sengodan et al. |
| 2004/0015572 A1 | 1/2004 | Kang |
| 2004/0024851 A1 | 2/2004 | Naidoo et al. |
| 2004/0037295 A1 | 2/2004 | Tanaka et al. |
| 2004/0054789 A1 | 3/2004 | Breh et al. |
| 2004/0086088 A1 | 5/2004 | Naidoo et al. |
| 2004/0086090 A1 | 5/2004 | Naidoo et al. |
| 2004/0086093 A1 | 5/2004 | Schranz |
| 2004/0103308 A1 | 5/2004 | Paller |
| 2004/0117330 A1 | 6/2004 | Ehlers et al. |
| 2004/0117462 A1 | 6/2004 | Bodin et al. |
| 2004/0117465 A1 | 6/2004 | Bodin et al. |
| 2004/0123149 A1 | 6/2004 | Tyroler |
| 2004/0139227 A1 | 7/2004 | Takeda |
| 2004/0143749 A1 | 7/2004 | Tajalli et al. |
| 2004/0155757 A1 | 8/2004 | Litwin et al. |
| 2004/0162902 A1 | 8/2004 | Davis |
| 2004/0163073 A1 | 8/2004 | Krzyzanowski et al. |
| 2004/0163118 A1 | 8/2004 | Mottur |
| 2004/0169288 A1 | 9/2004 | Hsieh et al. |
| 2004/0177163 A1 | 9/2004 | Casey et al. |
| 2004/0189460 A1 | 9/2004 | Heaton et al. |
| 2004/0189871 A1 | 9/2004 | Kurosawa et al. |
| 2004/0196844 A1 | 10/2004 | Hagino |
| 2004/0199645 A1 | 10/2004 | Rouhi |
| 2004/0202351 A1 | 10/2004 | Park et al. |
| 2004/0212503 A1 | 10/2004 | Stilp |
| 2004/0215694 A1 | 10/2004 | Podolsky |
| 2004/0215700 A1 | 10/2004 | Shenfield et al. |
| 2004/0223605 A1 | 11/2004 | Donnelly |
| 2004/0243835 A1 | 12/2004 | Terzis et al. |
| 2004/0243996 A1 | 12/2004 | Sheehy et al. |
| 2004/0246339 A1 | 12/2004 | Ooshima et al. |
| 2004/0249922 A1 | 12/2004 | Hackman et al. |
| 2004/0257433 A1 | 12/2004 | Lia et al. |
| 2004/0260407 A1 | 12/2004 | Wimsatt |
| 2004/0260427 A1 | 12/2004 | Wimsatt |
| 2004/0267937 A1 | 12/2004 | Klemets |
| 2005/0010866 A1 | 1/2005 | Humpleman et al. |
| 2005/0015805 A1 | 1/2005 | Iwamura |
| 2005/0023858 A1 | 2/2005 | Bingle et al. |
| 2005/0024203 A1 | 2/2005 | Wolfe |
| 2005/0038325 A1 | 2/2005 | Moll |
| 2005/0038326 A1 | 2/2005 | Mathur |
| 2005/0044061 A1 | 2/2005 | Klemow |
| 2005/0052831 A1 | 3/2005 | Chen |
| 2005/0060411 A1 | 3/2005 | Coulombe et al. |
| 2005/0066045 A1 | 3/2005 | Johnson et al. |
| 2005/0069098 A1 | 3/2005 | Kalervo et al. |
| 2005/0079855 A1 | 4/2005 | Jethi et al. |
| 2005/0086126 A1 | 4/2005 | Patterson |
| 2005/0086211 A1 | 4/2005 | Mayer |
| 2005/0091696 A1 | 4/2005 | Wolfe et al. |
| 2005/0096753 A1 | 5/2005 | Arling et al. |
| 2005/0102152 A1 | 5/2005 | Hodges |
| 2005/0108091 A1 | 5/2005 | Sotak et al. |
| 2005/0108369 A1 | 5/2005 | Sather et al. |
| 2005/0120082 A1 | 6/2005 | Hesselink et al. |
| 2005/0125083 A1 | 6/2005 | Kiko |
| 2005/0128068 A1 | 6/2005 | Winick et al. |
| 2005/0128083 A1 | 6/2005 | Puzio et al. |
| 2005/0144312 A1 | 6/2005 | Kadyk et al. |
| 2005/0149639 A1 | 7/2005 | Vrielink et al. |
| 2005/0149746 A1 | 7/2005 | Lu et al. |
| 2005/0156568 A1 | 7/2005 | Yueh |
| 2005/0159823 A1 | 7/2005 | Hayes et al. |
| 2005/0169288 A1 | 8/2005 | Kamiwada et al. |
| 2005/0184865 A1 | 8/2005 | Han et al. |
| 2005/0197847 A1 | 9/2005 | Smith |
| 2005/0200474 A1 | 9/2005 | Behnke |
| 2005/0204076 A1 | 9/2005 | Cumpson et al. |
| 2005/0210532 A1 | 9/2005 | Winick |
| 2005/0216302 A1 | 9/2005 | Raji et al. |
| 2005/0216580 A1 | 9/2005 | Raji et al. |
| 2005/0222820 A1 | 10/2005 | Chung |
| 2005/0231349 A1 | 10/2005 | Bhat |
| 2005/0237182 A1 | 10/2005 | Wang |
| 2005/0249199 A1 | 11/2005 | Albert et al. |
| 2005/0256608 A1 | 11/2005 | King et al. |
| 2005/0267605 A1 | 12/2005 | Lee et al. |
| 2005/0273831 A1 | 12/2005 | Slomovich et al. |
| 2005/0276389 A1 | 12/2005 | Hinkson et al. |
| 2005/0280964 A1 | 12/2005 | Richmond et al. |
| 2006/0009863 A1 | 1/2006 | Lingemann |
| 2006/0010078 A1 | 1/2006 | Rezvani et al. |
| 2006/0018328 A1 | 1/2006 | Mody et al. |
| 2006/0045074 A1 | 3/2006 | Lee |
| 2006/0051122 A1 | 3/2006 | Kawazu et al. |
| 2006/0063534 A1 | 3/2006 | Kokkonen et al. |
| 2006/0064305 A1 | 3/2006 | Alonso |
| 2006/0064478 A1 | 3/2006 | Sirkin |
| 2006/0067344 A1 | 3/2006 | Sakurai |
| 2006/0067484 A1 | 3/2006 | Elliot et al. |
| 2006/0075235 A1 | 4/2006 | Renkis |
| 2006/0078344 A1 | 4/2006 | Kawazu et al. |
| 2006/0088092 A1 | 4/2006 | Chen et al. |
| 2006/0105713 A1 | 5/2006 | Zheng et al. |
| 2006/0109113 A1 | 5/2006 | Reyes et al. |
| 2006/0111095 A1 | 5/2006 | Weigand |
| 2006/0129837 A1 | 6/2006 | Im et al. |
| 2006/0132302 A1 | 6/2006 | Stilp |
| 2006/0142880 A1 | 6/2006 | Deen et al. |
| 2006/0142968 A1 | 6/2006 | Han et al. |
| 2006/0143268 A1 | 6/2006 | Chatani |
| 2006/0145842 A1 | 7/2006 | Stilp |
| 2006/0161270 A1 | 7/2006 | Luskin et al. |
| 2006/0161662 A1 | 7/2006 | Ng et al. |
| 2006/0161960 A1 | 7/2006 | Benoit |
| 2006/0167784 A1 | 7/2006 | Hoffberg |
| 2006/0168178 A1 | 7/2006 | Hwang et al. |
| 2006/0181406 A1 | 8/2006 | Petite et al. |
| 2006/0182100 A1 | 8/2006 | Li et al. |
| 2006/0187900 A1 | 8/2006 | Akbar |
| 2006/0190458 A1 | 8/2006 | Mishina et al. |
| 2006/0197660 A1 | 9/2006 | Luebke et al. |
| 2006/0200845 A1 | 9/2006 | Foster et al. |
| 2006/0206220 A1 | 9/2006 | Amundson |
| 2006/0209857 A1 | 9/2006 | Hicks |
| 2006/0218593 A1 | 9/2006 | Afshary et al. |
| 2006/0220830 A1 | 10/2006 | Bennett et al. |

(56) References Cited

U.S. PATENT DOCUMENTS

| | | |
|---|---|---|
| 2006/0222153 A1 | 10/2006 | Tarkoff et al. |
| 2006/0229746 A1 | 10/2006 | Ollis et al. |
| 2006/0230270 A1 | 10/2006 | Goffin |
| 2006/0242395 A1 | 10/2006 | Fausak |
| 2006/0245369 A1 | 11/2006 | Schimmelpfeng et al. |
| 2006/0246919 A1 | 11/2006 | Park et al. |
| 2006/0258342 A1 | 11/2006 | Fok et al. |
| 2006/0265489 A1 | 11/2006 | Moore |
| 2006/0271695 A1 | 11/2006 | Lavian |
| 2006/0282886 A1 | 12/2006 | Gaug |
| 2007/0002833 A1 | 1/2007 | Bajic |
| 2007/0005736 A1 | 1/2007 | Hansen et al. |
| 2007/0005957 A1 | 1/2007 | Sahita et al. |
| 2007/0006177 A1 | 1/2007 | Aiber et al. |
| 2007/0052675 A1 | 3/2007 | Chang |
| 2007/0055770 A1 | 3/2007 | Karmakar et al. |
| 2007/0061266 A1 | 3/2007 | Moore et al. |
| 2007/0063866 A1 | 3/2007 | Webb |
| 2007/0079151 A1 | 4/2007 | Connor et al. |
| 2007/0079385 A1 | 4/2007 | Williams et al. |
| 2007/0096981 A1 | 5/2007 | Abraham |
| 2007/0101345 A1 | 5/2007 | Takagi |
| 2007/0106124 A1 | 5/2007 | Kuriyama et al. |
| 2007/0130286 A1 | 6/2007 | Hopmann et al. |
| 2007/0142022 A1 | 6/2007 | Madonna et al. |
| 2007/0143440 A1 | 6/2007 | Reckamp et al. |
| 2007/0146484 A1 | 6/2007 | Horton et al. |
| 2007/0147419 A1 | 6/2007 | Tsujimoto et al. |
| 2007/0155325 A1 | 7/2007 | Bambic et al. |
| 2007/0162228 A1 | 7/2007 | Mitchell |
| 2007/0162680 A1 | 7/2007 | Mitchell et al. |
| 2007/0192486 A1 | 8/2007 | Wilson et al. |
| 2007/0198698 A1 | 8/2007 | Boyd et al. |
| 2007/0216783 A1 | 9/2007 | Ortiz et al. |
| 2007/0223465 A1 | 9/2007 | Wang et al. |
| 2007/0226182 A1 | 9/2007 | Sobotka et al. |
| 2007/0230415 A1 | 10/2007 | Malik |
| 2007/0245223 A1 | 10/2007 | Siedzik et al. |
| 2007/0256105 A1 | 11/2007 | Tabe |
| 2007/0265866 A1 | 11/2007 | Fehling et al. |
| 2007/0271398 A1 | 11/2007 | Manchester et al. |
| 2007/0286210 A1 | 12/2007 | Gutt et al. |
| 2007/0286369 A1 | 12/2007 | Gutt et al. |
| 2007/0287405 A1 | 12/2007 | Radtke |
| 2007/0288849 A1 | 12/2007 | Moorer et al. |
| 2007/0298772 A1 | 12/2007 | Owens et al. |
| 2008/0001734 A1 | 1/2008 | Stilp et al. |
| 2008/0013957 A1 | 1/2008 | Akers et al. |
| 2008/0027587 A1 | 1/2008 | Nickerson et al. |
| 2008/0042826 A1 | 2/2008 | Hevia et al. |
| 2008/0048975 A1 | 2/2008 | Leibow |
| 2008/0065681 A1 | 3/2008 | Fontijn et al. |
| 2008/0072244 A1 | 3/2008 | Eker et al. |
| 2008/0084296 A1 | 4/2008 | Kutzik et al. |
| 2008/0091793 A1 | 4/2008 | Diroo et al. |
| 2008/0104516 A1 | 5/2008 | Lee |
| 2008/0109650 A1 | 5/2008 | Shim et al. |
| 2008/0112405 A1 | 5/2008 | Cholas et al. |
| 2008/0117029 A1 | 5/2008 | Dohrmann et al. |
| 2008/0126535 A1 | 5/2008 | Zhu et al. |
| 2008/0133725 A1 | 6/2008 | Shaouy |
| 2008/0141303 A1 | 6/2008 | Walker et al. |
| 2008/0141341 A1 | 6/2008 | Vinogradov et al. |
| 2008/0147834 A1 | 6/2008 | Quinn et al. |
| 2008/0163355 A1 | 7/2008 | Chu |
| 2008/0168404 A1 | 7/2008 | Ording |
| 2008/0170511 A1 | 7/2008 | Shorty et al. |
| 2008/0180240 A1 | 7/2008 | Raji et al. |
| 2008/0183842 A1 | 7/2008 | Raji et al. |
| 2008/0189609 A1 | 8/2008 | Larson et al. |
| 2008/0219239 A1 | 9/2008 | Bell et al. |
| 2008/0235326 A1 | 9/2008 | Parsi et al. |
| 2008/0235600 A1 | 9/2008 | Harper et al. |
| 2008/0240372 A1 | 10/2008 | Frenette |
| 2008/0253391 A1 | 10/2008 | Krits et al. |
| 2008/0261540 A1 | 10/2008 | Rohani et al. |
| 2008/0284587 A1 | 11/2008 | Saigh et al. |
| 2008/0316024 A1 | 12/2008 | Chantelou et al. |
| 2009/0019141 A1 | 1/2009 | Bush et al. |
| 2009/0036142 A1 | 2/2009 | Yan |
| 2009/0041467 A1 | 2/2009 | Carleton et al. |
| 2009/0042649 A1 | 2/2009 | Hsieh et al. |
| 2009/0049488 A1 | 2/2009 | Stransky |
| 2009/0063582 A1 | 3/2009 | Anna et al. |
| 2009/0066788 A1 | 3/2009 | Baum et al. |
| 2009/0066789 A1 | 3/2009 | Baum et al. |
| 2009/0067395 A1 | 3/2009 | Curtis et al. |
| 2009/0070436 A1 | 3/2009 | Dawes et al. |
| 2009/0070473 A1 | 3/2009 | Baum et al. |
| 2009/0070477 A1 | 3/2009 | Baum et al. |
| 2009/0070681 A1 | 3/2009 | Dawes et al. |
| 2009/0070682 A1 | 3/2009 | Dawes et al. |
| 2009/0070692 A1 | 3/2009 | Dawes et al. |
| 2009/0074184 A1 | 3/2009 | Baum et al. |
| 2009/0077167 A1 | 3/2009 | Baum et al. |
| 2009/0077622 A1 | 3/2009 | Baum et al. |
| 2009/0077623 A1 | 3/2009 | Baum et al. |
| 2009/0077624 A1 | 3/2009 | Baum et al. |
| 2009/0100329 A1 | 4/2009 | Espinoza |
| 2009/0100492 A1 | 4/2009 | Hicks, III et al. |
| 2009/0113344 A1 | 4/2009 | Nesse et al. |
| 2009/0119397 A1 | 5/2009 | Neerdaels |
| 2009/0125708 A1 | 5/2009 | Woodring et al. |
| 2009/0128365 A1 | 5/2009 | Laskin |
| 2009/0134998 A1 | 5/2009 | Baum et al. |
| 2009/0138600 A1 | 5/2009 | Baum et al. |
| 2009/0138958 A1 | 5/2009 | Baum et al. |
| 2009/0146846 A1 | 6/2009 | Grossman |
| 2009/0158189 A1 | 6/2009 | Itani |
| 2009/0158292 A1 | 6/2009 | Rattner et al. |
| 2009/0165114 A1 | 6/2009 | Baum et al. |
| 2009/0177906 A1 | 7/2009 | Paniagua, Jr. et al. |
| 2009/0204693 A1 | 8/2009 | Andreev et al. |
| 2009/0221368 A1 | 9/2009 | Yen et al. |
| 2009/0240787 A1 | 9/2009 | Denny |
| 2009/0240814 A1 | 9/2009 | Brubacher et al. |
| 2009/0240946 A1 | 9/2009 | Yeap et al. |
| 2009/0256708 A1 | 10/2009 | Hsiao et al. |
| 2009/0303100 A1 | 12/2009 | Zemany |
| 2009/0313693 A1 | 12/2009 | Rogers |
| 2009/0322510 A1 | 12/2009 | Berger et al. |
| 2010/0008274 A1 | 1/2010 | Kneckt et al. |
| 2010/0023865 A1 | 1/2010 | Fulker et al. |
| 2010/0026487 A1 | 2/2010 | Hershkovitz |
| 2010/0030578 A1 | 2/2010 | Siddique et al. |
| 2010/0030810 A1 | 2/2010 | Marr |
| 2010/0052612 A1 | 3/2010 | Raji et al. |
| 2010/0066530 A1 | 3/2010 | Cohn et al. |
| 2010/0074112 A1 | 3/2010 | Derr et al. |
| 2010/0077111 A1 | 3/2010 | Holmes et al. |
| 2010/0082744 A1 | 4/2010 | Raji et al. |
| 2010/0095111 A1 | 4/2010 | Gutt et al. |
| 2010/0095369 A1 | 4/2010 | Gutt et al. |
| 2010/0121521 A1 | 5/2010 | Kiribayashi |
| 2010/0153853 A1 | 6/2010 | Dawes et al. |
| 2010/0159967 A1 | 6/2010 | Pounds et al. |
| 2010/0185857 A1 | 7/2010 | Neitzel et al. |
| 2010/0197219 A1 | 8/2010 | Issa et al. |
| 2010/0210240 A1 | 8/2010 | Mahaffey et al. |
| 2010/0212012 A1 | 8/2010 | Touboul et al. |
| 2010/0218104 A1 | 8/2010 | Lewis |
| 2010/0245107 A1 | 9/2010 | Fulker et al. |
| 2010/0267390 A1 | 10/2010 | Lin et al. |
| 2010/0280635 A1 | 11/2010 | Cohn et al. |
| 2010/0280637 A1 | 11/2010 | Cohn et al. |
| 2010/0298024 A1 | 11/2010 | Choi |
| 2010/0321151 A1 | 12/2010 | Matsuura et al. |
| 2010/0332164 A1 | 12/2010 | Aisa et al. |
| 2011/0000521 A1 | 1/2011 | Tachibana |
| 2011/0029875 A1 | 2/2011 | Milch |
| 2011/0040415 A1 | 2/2011 | Nickerson et al. |
| 2011/0040877 A1 | 2/2011 | Foisy |
| 2011/0096678 A1 | 4/2011 | Ketonen |
| 2011/0102588 A1 | 5/2011 | Trundle et al. |

(56) References Cited

U.S. PATENT DOCUMENTS

| | | | |
|---|---|---|---|
| 2011/0197327 A1 | 8/2011 | McElroy et al. |
| 2011/0234392 A1 | 9/2011 | Cohn et al. |
| 2011/0283006 A1 | 11/2011 | Ramamurthy |
| 2012/0023151 A1 | 1/2012 | Bennett, III et al. |
| 2012/0066608 A1 | 3/2012 | Sundermeyer et al. |
| 2012/0081842 A1 | 4/2012 | Ewing et al. |
| 2012/0154138 A1 | 6/2012 | Cohn et al. |
| 2012/0182245 A1 | 7/2012 | Hutton |
| 2012/0242788 A1 | 9/2012 | Chuang et al. |
| 2012/0260184 A1 | 10/2012 | Dawes et al. |
| 2012/0278877 A1 | 11/2012 | Baum et al. |
| 2012/0327242 A1 | 12/2012 | Barley et al. |
| 2014/0143695 A1 | 5/2014 | Sundermeyer et al. |
| 2014/0143854 A1 | 5/2014 | Lopez et al. |
| 2014/0153695 A1 | 6/2014 | Yanagisawa et al. |
| 2015/0088982 A1 | 3/2015 | Johnson et al. |

FOREIGN PATENT DOCUMENTS

| | | |
|---|---|---|
| AU | 2011250886 A1 | 1/2013 |
| AU | 2011305163 A1 | 5/2013 |
| CA | 2559842 C | 5/2014 |
| EP | 0295146 A2 | 12/1988 |
| EP | 0308046 A2 | 3/1989 |
| EP | 0591585 A1 | 4/1994 |
| EP | 0978111 B1 | 11/2001 |
| EP | 2112784 A1 | 10/2009 |
| FR | 2584217 A1 | 1/1987 |
| FR | 2661023 A1 | 10/1991 |
| FR | 2793334 A1 | 11/2000 |
| GB | 2222288 A | 2/1990 |
| GB | 2273593 A | 6/1994 |
| GB | 2319373 A | 5/1998 |
| GB | 2324630 A | 10/1998 |
| GB | 2335523 A | 9/1999 |
| GB | 2349293 A | 10/2000 |
| GB | 2370400 A | 6/2002 |
| JP | 8227491 A | 9/1996 |
| JP | 2002055895 A | 2/2002 |
| JP | 2003085258 A | 3/2003 |
| JP | 2003141659 A | 5/2003 |
| JP | 2004192659 A | 7/2004 |
| KR | 20060021605 A | 3/2006 |
| WO | WO-8907855 A1 | 8/1989 |
| WO | WO-9403881 A1 | 2/1994 |
| WO | WO-9636301 A1 | 11/1996 |
| WO | WO-9849663 A1 | 11/1998 |
| WO | WO-9934339 A2 | 7/1999 |
| WO | WO-0152478 A2 | 7/2001 |
| WO | WO-0199078 A2 | 12/2001 |
| WO | WO-0221300 A1 | 3/2002 |
| WO | WO-02097584 A2 | 12/2002 |
| WO | WO-03040839 A1 | 5/2003 |
| WO | WO-2004004222 A1 | 1/2004 |
| WO | WO-2004098127 A1 | 11/2004 |
| WO | WO-2004107710 A1 | 12/2004 |
| WO | WO-2005091218 A2 | 9/2005 |
| WO | WO-2005091218 A3 | 7/2006 |
| WO | WO-2007038872 A1 | 4/2007 |
| WO | WO-2007124453 A2 | 11/2007 |
| WO | WO-2009006670 A1 | 1/2009 |
| WO | WO-2009145747 A1 | 12/2009 |

OTHER PUBLICATIONS

Alarm.com—Interactive Security Systems, Frequently Asked Questions [retrieved on Nov. 4, 2003 ], 3 pages.
Alarm.com—Interactive Security Systems, Overview [retrieved on Nov. 4, 2003], 2 pages.
Alarm.com—Interactive Security Systems, Product Advantages [retrieved on Nov. 4, 2003], 3 pages.
Control Panel Standard—Features for False Alarm Reduction, The Security Industry Association, SIA 2009, pp. 1-48.
Co-pending U.S. Appl. No. 11/761,745, filed Jun. 12, 2007.
Co-pending U.S. Appl. No. 12/019,568, filed Jan. 24, 2008.
Co-pending U.S. Appl. No. 12/189,780, filed Aug. 11, 2008.
Co-pending U.S. Appl. No. 12/189,785, filed Aug. 11, 2008.
Co-pending U.S. Appl. No. 12/197,931, filed Aug. 25, 2008.
Co-pending U.S. Appl. No. 12/197,946, filed Aug. 25, 2008.
Co-pending U.S. Appl. No. 12/197,958, filed Aug. 25, 2008.
Co-pending U.S. Appl. No. 12/198,039, filed Aug. 25, 2008.
Co-pending U.S. Appl. No. 12/198,051, filed Aug. 25, 2008.
Co-pending U.S. Appl. No. 12/198,060, filed May 28, 2008.
Co-pending U.S. Appl. No. 12/198,066, filed Aug. 25, 2008.
Co-pending U.S. Appl. No. 12/269,735, filed Nov. 12, 2008.
Co-pending U.S. Appl. No. 12/539,537, filed Aug. 11, 2009.
Co-pending U.S. Appl. No. 12/568,718, filed Sep. 29, 2009.
Co-pending U.S. Appl. No. 12/630,092, filed Dec. 3, 2009.
Co-pending U.S. Appl. No. 12/691,992, filed Jan. 22, 2010.
Co-pending U.S. Appl. No. 12/718,385, filed Mar. 5, 2010.
Co-pending U.S. Appl. No. 12/732,879, filed Mar. 26, 2010.
Co-pending U.S. Appl. No. 12/750,470, filed Mar. 30, 2010.
Co-pending U.S. Appl. No. 12/770,253, filed Apr. 29, 2010.
Co-pending U.S. Appl. No. 12/770,365, filed Apr. 29, 2010.
Co-pending U.S. Appl. No. 12/771,071, filed Apr. 30, 2010.
Co-pending U.S. Appl. No. 12/771,372, filed Apr. 30, 2010.
Co-pending U.S. Appl. No. 12/771,471, filed Apr. 30, 2010.
Co-pending U.S. Appl. No. 12/771,624, filed Apr. 30, 2010.
Co-pending U.S. Appl. No. 12/892,303, filed Sep. 28, 2010.
Co-pending U.S. Appl. No. 12/892,801, filed Sep. 28, 2010.
Co-pending U.S. Appl. No. U12/952,080, filed Nov. 22, 2010.
Co-pending U.S. Appl. No. 12/970,313, filed Dec. 16, 2010.
Co-pending U.S. Appl. No. 12/971,282, filed Dec. 17, 2010.
Co-pending U.S. Appl. No. 12/972,740, filed Dec. 20, 2010.
Co-pending U.S. Appl. No. 13/099,293, filed May 2, 2011.
Co-pending U.S. Appl. No. 13/104,932, filed May 10, 2011.
Co-pending U.S. Appl. No. 13/104,936, filed May 10, 2011.
Co-pending U.S. Appl. No. 13/153,807, filed Jun. 6, 2011.
Co-pending U.S. Appl. No. 13/244,008, filed Sep. 23, 2011.
Co-pending U.S. Appl. No. 13/311,365, filed Dec. 5, 2011.
Co-pending U.S. Appl. No. 13/334,998, filed Dec. 22, 2011.
Co-pending U.S. Appl. No. 13/335,279, filed Dec. 22, 2011.
Co-pending U.S. Appl. No. 13/400,477, filed Dec. 22, 2011.
Co-pending U.S. Appl. No. 13/406,264, filed Feb. 27, 2012.
Co-pending U.S. Appl. No. 13/486,276, filed Jun. 1, 2012.
Co-pending U.S. Appl. No. 13/531,757, filed Jun. 25, 2012.
Co-pending U.S. Appl. No. 13/718,851, filed Dec. 18, 2012.
Co-pending U.S. Appl. No. 13/725,607, filed Dec. 21, 2012.
Co-pending U.S. Appl. No. 13/925,181, filed Jun. 24, 2013.
Co-pending U.S. Appl. No. 13/929,568, filed Jun. 27, 2013.
Co-pending U.S. Appl. No. 13/932,816, filed Jul. 1, 2013.
Co-pending U.S. Appl. No. 13/932,837, filed Jul. 1, 2013.
Co-pending U.S. Appl. No. 29/419,628, filed Apr. 30, 2012.
Co-pending U.S. Appl. No. 29/420,337, filed May 8, 2012.
Examination Report under Section 18(3) re for UK Patent Application No. GB0620362.4, mailed on Aug. 13, 2007.
Examination Report under Section 18(3) re for UK Patent Application No. GB0724248.0, mailed on Jun. 4, 2008.
Examination Report under Section 18(3) re for UK Patent Application No. GB0724248.0, mailed on Jan. 30, 2008.
Examination Report under Section 18(3) re for UK Patent Application No. GB0724760.4, mailed on Jan. 30, 2008.
Examination Report under Section 18(3) re for UK Patent Application No. GB0800040.8, mailed on Jan. 30, 2008.
Faultline, "AT&T Targets Video Home Security as Next Broadband Market," the Register, Nov. 2, 2006, 2 pages.
Final Office Action mailed 01 Aug. 2011 for U.S. Appl. No. 12/630,092 filed Dec. 3, 2009.
Final Office Action mailed Jun. 1, 2009 for U.S. Appl. No. 11/084,232 filed Mar. 16, 2005.
Final Office Action mailed Jun. 5, 2012 for U.S. Appl. No. 12/771,071 filed Apr. 30, 2010.
Final Office Action mailed May 9, 2013 for U.S. Appl. No. 12/189,780, filed Aug. 11, 2008.
Final Office Action mailed May 9, 2013 for U.S. Appl. No. 12/952,080, filed Nov. 22, 2010.

(56) References Cited

OTHER PUBLICATIONS

Final Office Action mailed Jan. 10, 2011 for U.S. Appl. No. 12/189,785, filed Aug. 11, 2008.
Final Office Action mailed Jun. 10, 2011 for U.S. Appl. No. 11/084,232, filed Mar. 16, 2005.
Final Office Action mailed Jul. 12, 2010 for U.S. Appl. No. 12/019,554, filed Jan. 24, 2008.
Final Office Action mailed Jan. 13, 2011 for U.S. Appl. No. 12/189,780, filed Aug. 11, 2008.
Final Office Action mailed Sep. 14, 2011 for U.S. Appl. No. 12/197,931 filed Aug. 25, 2008.
Final Office Action mailed Feb. 16, 2011 for U.S. Appl. No. 12/019,568 filed Jan. 24, 2008.
Final Office Action mailed Oct. 17, 2012 for U.S. Appl. No. 12/637,671, filed Dec. 14, 2009.
Final Office Action mailed Sep. 17, 2012 for U.S. Appl. No. 12/197,958, filed Aug. 25, 2008.
Final Office Action mailed Mar. 21, 2013 for U.S. Appl. No. 12/691,992, filed Jan. 22, 2010.
Final Office Action mailed Jul. 23, 2013 for U.S. Appl. No. 13/531,757, filed Jun. 25, 2012.
Final Office Action mailed Feb. 26, 2013 for U.S. Appl. No. 12/771,471, filed Apr. 30, 2010.
Final Office Action mailed Jun. 29, 2012 for U.S. Appl. No. 12/539,537 filed Aug. 11, 2009.
Final Office Action mailed Dec. 31, 2012 for U.S. Appl. No. 12/770,365, filed Apr. 29, 2010.
Final Office Action mailed Oct. 31, 2012 for U.S. Appl. No. 12/771,624, filed Apr. 30, 2010.
Form PCT/ISA/210, "PCT International Search Report for the Application No. PCT/US05/08766," May 23, 2006, 2 pages.
Form PCT/ISA/210, "PCT International Search Report for the Application No. PCT/US08/72831," Nov. 4, 2008, 2 pages.
Form PCT/ISA/210, "PCT International Search Report for the Application No. PCT/US08/74246," Nov. 14, 2008, 2 pages.
Form PCT/ISA/210, "PCT International Search Report for the Application No. PCT/US08/74260," Nov. 13, 2008, 2 pages.
Form PCT/ISA/210, "PCT International Search Report for the Application No. PCT/US09/53485," Oct. 22, 2009, 2 pages.
Form PCT/ISA/210, "PCT International Search Report for the Application No. PCT/US09/55559," Nov. 12, 2009, 2 pages.
Form PCT/ISA/210, "PCT International Search Report for the Application No. PCT/US10/50585," Dec. 30, 2010, 2 pages.
Form PCT/ISA/210, "PCT International Search Report for the Application No. PCT/US10/57674," Mar. 2, 2011, 2 pages.
Form PCT/ISA/210, "PCT International Search Report for the Application No. PCT/US11/34858," Oct. 3, 2011, 2 pages.
Form PCT/ISA/210, "PCT International Search Report for the Application No. PCT/US11/35994," Sep. 28, 2011, 2 pages.
Form PCT/ISA/210, "PCT International Search Report for the Application No. PCT/US11/53136," Jan. 5, 2012, 2 pages.
From PCT/ISA/210, "PCT International Search Report of the Application No. PCT/US08/83254," Jan. 14, 2009, 2 pages.
Form PCT/ISA/220, "PCT Notification of Transmittal of the International Search Report and the Written Opinion of the International Searching Authority, or the Declaration for the Application No. PCT/US05/08766" May 23, 2006, 1 page.
Form PCT/ISA/220, "PCT Notification of Transmittal of the International Search Report and the Written Opinion of the International Searching Authority, or the Declaration for the Application No. PCT/US08/72831," Nov. 4, 2008, 1 page.
Form PCT/ISA/220, "PCT Notification of Transmittal of the International Search Report and the Written Opinion of the International Searching Authority, or the Declaration for the Application No. PCT/US08/74246" Nov. 14, 2008, 1 page.
Form PCT/ISA/220, "PCT Notification of Transmittal of the International Search Report and the Written Opinion fo the International Searching Authority, or the Declaration for the Application No. PCT/US08/74260," Nov. 13, 2008, 1 page.
Form PCT/ISA/220, "PCT Notification of Transmittal of the International Search Report and the Written Opinion of the International Searching Authority, or the Declaration for the Application No. PCT/US09/53485" Oct. 22, 2009, 1 page.
Form PCT/ISA/220, "PCT Notification of Transmittal of the International Search Report and the Written Opinion of the International Searching Authority, or the Declaration for the Application No. PCT/US09/55559," Nov. 12, 2009, 1 page.
Form PCT/ISA/220, "PCT Notification of Transmittal of the International Search Report and the Written Opinion of the International Searching Authority, or the Declaration for the Application No. PCT/US10/50585" Dec. 30, 2010, 1 page.
Form PCT/ISA/220, "PCT Notification of Transmittal of the International Search Report and the Written Opinion of the International Searching Authority, or the Declaration for the Application No. PCT/US10/57674," Mar. 2, 2011, 1 page.
Form PCT/ISA/220, "PCT Notification of Transmittal of the International Search Report and the Written Opinion of the International Searching Authority, or the Declaration for the Application No. PCT/US11/35994," Sep. 28, 2011, 1 page.
Form PCT/ISA/220, "PCT Notification of Transmittal of the International Search Report and the Written Opinion of the International Searching Authority, or the Declaration of the Application No. PCT/US08/83254," Jan. 14, 2009, 1 page.
Form PCT/ISA/237, "PCT Written Opinion ofthe International Searching Authority for the Application No. PCT/US05/08766," May 23, 2006, 5 pages.
Form PCT/ISA/237, "PCT Written Opinion of the International Searching Authority for the Application No. PCT/US08/72831," Nov. 4, 2008, 6 pages.
Form PCT/ISA/237, "PCT Written Opinion of the International Searching Authority for the Application No. PCT/US08/74246," Nov. 14, 2008, 6 pages.
Form PCT/ISA/237, "PCT Written Opinion of the International Searching Authority for the Application No. PCT/US08/74260," Nov. 13, 2008, 6 pages.
Form PCT/ISA/237, "PCT Written Opinion of the International Searching Authority for the Application No. PCT/US09/53485," Oct. 22, 2009, 8 pages.
Form PCT/ISA/237, "PCT Written Opinion of the International Searching Authority for the Application No. PCT/US09/55559," Nov. 12, 2009, 6 pages.
Form PCT/ISA/237, "PCT Written Opinion of the International Searching Authority for the Application No. PCT/US10/50585," Dec. 30, 2010, 7 pages.
Form PCT/ISA/237, "PCT Written Opinion of the International Searching Authority for the Application No. PCT/US10/57674," Mar. 2, 2011, 6 pages.
Form PCT/ISA/237, "PCT Written Opinion of the International Searching Authority for the Application No. PCT/US11/34858," Oct. 3, 2011, 8 pages.
Form PCT/ISA/237, "PCT Written Opinion of the International Searching Authority for the Application No. PCT/US11/35994," Sep. 28, 2011, 11 pages.
Form PCT/ISA/237, "PCT Written Opinion of the International Searching Authority for the Application No. PCT/US11/53136," Jan. 5, 2012.
Form PCT/ISA/237, "PCT Written Opinion ofthe International Searching Authority of the Application No. PCT/US08/83254," Jan. 14, 2009, 7 pages.
Gutierrez J.A., "On the Use of IEEE 802.15.4 to Enable Wireless Sensor Networks in Building Automation," Personal, Indoor and Mobile Radio Communications (PIMRC), 15th IEEE International Symposium, 2004, vol. 3, pp. 1865-1869.
International Search Report for Application No. PCT/US13/48324, mailed on Jan . 14, 2014, 2 pages.
International Search Report for Application No. PCT/US2014/050548, mailed on Mar. 18, 2015, 4 pages.
Lagotek Wireless Home Automation System, May 2006 [retrieved on Aug. 22, 2012].
Non-Final Office Action mailed Apr. 4, 2013 for U.S. Appl. No. 12/197,931, filed Aug. 25, 2008.

(56) References Cited

OTHER PUBLICATIONS

Non-Final Office Action mailed Mar. 4, 2013 for U.S. Appl. No. 13/400,477, filed Feb. 20, 2012.
Non-Final Office Action mailed Jan. 5, 2010 for U.S. Appl. No. 12/019,554, filed Jan. 24, 2008.
Non-Final Office Action mailed May 5, 2010 for U.S. Appl. No. 12/189,780, filed Aug. 11, 2008.
Non-Final Office Action mailed May 5, 2010 for U.S. Appl. No. 12/189,785, filed Aug. 11, 2008.
Non-Final Office Action mailed Feb. 7, 2012 for U.S. Appl. No. 12/637,671, filed Dec. 14, 2009.
Non-Final Office Action mailed Feb. 7, 2013 for U.S. Appl. No. 12/970,313, filed Dec. 16, 2010.
Non-Final Office Action mailed Feb. 8, 2012 for U.S. Appl. No. 12/630,092, filed Dec. 3, 2009.
Non-Final Office Action mailed Apr. 9, 2012 for U.S. Appl. No. 12/771,624, filed Apr. 30, 2010.
Non-Final Office Action mailed Dec. 9, 2008 for U.S. Appl. No. 11/084,232, filed Mar. 16, 2005.
Non-Final Office Action mailed Aug. 10, 2012 for U.S. Appl. No. 12/771,471 filed Apr. 30, 2010.
Non-Final Office Action mailed Oct. 11, 2012 for U.S. Appl. No. 12/019568, filed Jan. 24, 2008.
Non-Final Office Action mailed Apr. 12, 2012 for U.S. Appl. No. 12/770,365, filed Apr. 29, 2010.
Non-Final Office Action mailed Jul. 12, 2012 for U.S. Appl. No. 12/691,992, filed Jan. 22, 2010.
Non-Final Office Action mailed Oct. 12, 2012 for U.S. Appl. No. 12/630,092, filed Dec. 3, 2009.
Non-Final Office Action mailed Sep. 12, 2012 for U.S. Appl. No. 12/952,080, filed Nov. 22, 2010.
Non-Final Office Action mailed Apr. 13, 2010 for U.S. Appl. No. 11/761,745, filed Jun. 12, 2007.
Non-Final Office Action mailed Jul. 13, 2010 for U.S. Appl. No. 12/019,568, filed Jan. 24, 2008.
Non-Final Office Action mailed Nov. 14, 2012 for U.S. Appl. No. 13/531,757, filed Jun. 25, 2012.
Non-Final Office Action mailed Sep. 14, 2010 for U.S. Appl. No. 11/084,232, filed Mar. 16, 2005.
Non-Final Office Action mailed Sep. 16, 2011 for U.S. Appl. No. 12/539,537, filed Aug. 11, 2009.
Non-Final Office Action mailed Sep. 17, 2012 for U.S. Appl. No. 12/189,780, filed Aug. 11, 2008.
Non-Final Office Action mailed Aug. 18, 2011 for U.S. Appl. No. 12/197,958, filed Aug. 25, 2008.
Non-Final Office Action mailed Feb. 18, 2011 for U.S. Appl. No. 12/630,092, filed Dec. 3, 2009.
Non-Final Office Action mailed Jan. 18, 2012 for U.S. Appl. No. 12/771,071, filed Apr. 30, 2010.
Non-Final Office Action mailed Feb. 21, 2013 for U.S. Appl. No. 12/771,372, filed Apr. 30, 2010.
Non-Final Office Action mailed Jul. 21, 2010 for U.S. Appl. No. 12/630,092, filed Dec. 3, 2009.
Non-Final Office Action mailed Dec. 22, 2010 for U.S. Appl. No. 12/197,931, filed Aug. 25, 2008.
Non-Final Office Action mailed Jul. 22, 2013 for U.S. Appl. No. 12/630,092, filed Dec. 3, 2009.
Non-Final Office Action mailed May 23, 2013 for U.S. Appl. No. 13/104,932, filed May 10, 2011.
Non-Final Office Action mailed May 23, 2013 for U.S. Appl. No. 13/104,936, filed May 10, 2011.
Non-Final Office Action mailed Jan. 26, 2012 for U.S. Appl. No. 12/019,568, filed Jan. 24, 2008.
Non-Final Office Action mailed Nov. 26, 2010 for U.S. Appl. No. 12/197,958, filed Aug. 25, 2008.
Non-Final Office Action mailed Jun. 27, 2013 for U.S. Appl. No. 12/019,568, filed Jan. 24, 2008.
Non-Final Office Action mailed Dec. 30, 2009 for U.S. Appl. No. 11/084,232, filed Mar. 16, 2005.
Non-Final Office Action mailed May 30, 2008 for U.S. Appl. No. 11/084,232, filed Mar. 16, 2005.
Notice of Allowance mailed May 14, 2013 for U.S. Appl. No. 12/637,671, filed Dec. 14, 2009.
Notice of Allowance mailed Oct. 25, 2012 for U.S. Appl. No. 11/084,232, filed Mar. 16, 2005.
Requirement for Restriction/Election mailed Jan. 22, 2013 for U.S. Appl. No. 13/104,932, filed May 10, 2011.
Requirement for Restriction/Election mailed Jan. 22, 2013 for U.S. Appl. No. 13/104,936, filed May 10, 2011.
Requirement for Restriction/Election mailed Oct. 24, 2012 for U.S. Appl. No. 12/75,470, filed Mar. 30, 2010.
Security for the Future, Introducing 5804BD—Advanced two-way wireless remote technology, Advertisement, ADEMCO Group, Syosset, NY, circa 1997.
Supplemental European Search Report for Application No. EP05725743.8 mailed on Sep. 14, 2010, 2 pages.
Supplementary European Search Report for Application No. EP10819658, mailed on Mar. 10, 2015, 2 pages.
Supplementary European Search Report for Application No. EP11827671, mailed on Mar. 10, 2015, 2 pages.
Supplementary European Search Report for Application No. EP2191351, mailed on Jun. 23, 2014, 2 pages.
Supplementary Non-Final Office Action mailed Oct. 28, 2010 for U.S. Appl. No. 12/630,092, filed Dec. 3, 2009.
Supplementary Partial European Search Report for Application No. EP09807196, mailed on Nov. 17, 2014, 5 pages.
Topalis E., et al., "A Generic Network Management Architecture Targeted to Support Home Automation Networks and Home Internet Connectivity, Consumer Electronics, IEEE Transactions," 2000, vol. 46 (1), pp. 44-51.
Wireless, Battery-Powered Smoke Detectors, Brochure, SafeNight Technology, Inc. Roanoke, VA, 1995.
WLS906 Photoelectric Smoke Alarm, Data Sheet, DSC Security Products, Ontario, Canada, Jan. 1998.
X10—ActiveHome, Home Automation Made Easy [retrieved on Nov. 4, 2003], 3 pages.

\* cited by examiner

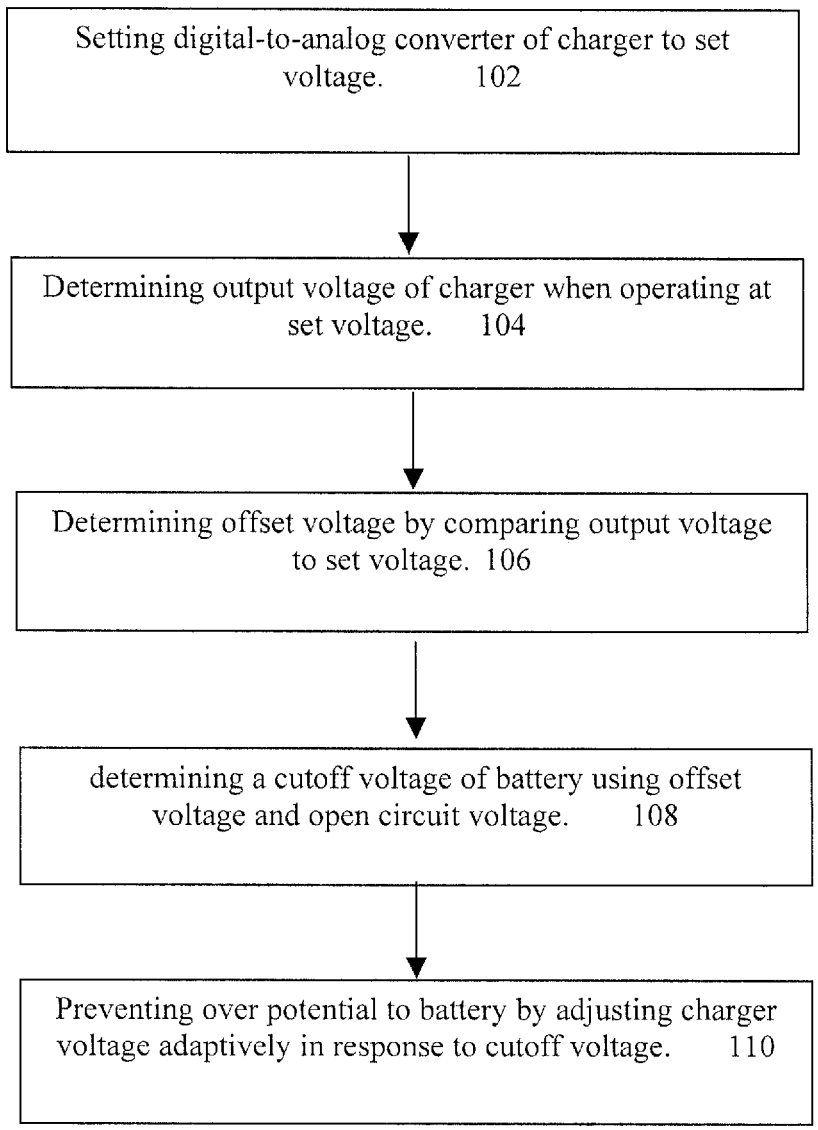

TEMPORAL VOLTAGE ADAPTIVE LITHIUM BATTERY CHARGER

RELATED APPLICATION

This application claims the benefit of U.S. Patent Application No. 61/788,473, filed Mar. 15, 2013.

TECHNICAL FIELD

Embodiments described herein relate generally to systems and methods for charging lithium batteries.

BACKGROUND

Typically Lithium battery chargers can be a single, fixed piece of silicon (chip) or a microprocessor based hardware that has digital to analog converters (DAC) and analog to digital converters (ADC) to set and/or determine charge voltage and charge current.

Li-ion cannot absorb overcharge, and, when fully charged, the charge current must be cut off. A continuous trickle charge would cause plating of metallic lithium, and this could compromise safety. To minimize stress, the lithium-ion battery is kept at the 4.20V/cell peak voltage as short a time as possible.

Another issue is that lithium capacity and open cell voltage change as the battery ages, due to phase changes in the anode/cathode, metal dissolution, and electrolyte and electrode oxidation. Any of these effects cause a decrease in the cell voltage as well as the capacity of the battery.

Lithium Chargers typically use a 3 or 4 stage charge cycle, comprising of constant current, constant voltage and/or equalization and charge termination.

The constant-current charge ends when the cell voltage reaches 4.2 V, at which the constant voltage stage begins. Charging is typically terminated by one of two methods, a minimum charge current or a timer. The minimum current approach monitors the charge current during the constant-voltage stage and terminates the charge when the charge current diminishes in the range of 0.02 C to 0.07 C.

The second method determines when the constant-voltage stage is invoked. Charging continues for an additional 2 hr, and then the charge is terminated. Charging in this manner replenishes a deeply depleted battery in roughly 2.5 hr to 3 h.

Another method to determine capacity and cutoff instead of current, is reading the Open Cell Voltage of the battery. This requires periodically disconnecting the battery from the charge circuit, and reading the voltage of the cell(s). This requires high accuracy A/D converters, precision tolerance components, as well as exemplary layout of the printed circuit board.

In order to safely charge a battery using an open cell or even cutoff current assumes a fresh battery. As a battery ages, the cutoff current or end of charge open cell voltage decreases. As a result, a fixed timer to guarantee the charger stops operating may eventually induce failure in a lithium battery due to the application of voltage across the battery, even though, in its present condition, it is actually at maximum capacity for a cell of that age.

For example, a fixed timer may allow 20 hours total charge time for a totally depleted 15 Amp-hour battery charged at 1 Amp. There is no distinction in partially charged, fully charged or empty batteries with fixed timers. For example, one has a 5-year old 15 Amp-hour battery, currently at 75% of charge. However, due to cell aging, it cannot charge to 100% capacity, but rather only 90%. If attempted to charge beyond 90%, the cell starts to heat due to the increased series resistance of the battery (from aging). Current chargers will attempt to charge this battery to full capacity for the entire 15 hours.

Due to the nature of processor driven battery chargers, the charger voltage may be derived from a bandgap or other voltage reference, as well as a fixed amplifier or digital to analog converter. In the DAC approach, the processor sets a digital value to the desired charger voltage output. However, due to silicon variations, component tolerances and PCB layout, the actual voltage supplied by the charger may have offsets from the expected value.

Another safety feature is monitoring the temperature of the Lithium battery. Some circuits stop charging when over heated (and reset the timer), or merely decrease the voltage applied to the battery. Either method may allow continual charging of a failing battery.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

BRIEF DESCRIPTION OF THE FIGURES

FIG. 1 is a flow diagram for a method of adaptively adjusting charger voltage to prevent over potential to a battery 100, under and embodiment.

DETAILED DESCRIPTION

Although the detailed description herein contains many specifics for the purposes of illustration, anyone of ordinary skill in the art will appreciate that many variations and alterations to the following details are within the scope of the embodiments described herein. Thus, the following illustrative embodiments are set forth without any loss of generality to, and without imposing limitations upon, the claimed invention.

An embodiment described herein adjusts the charger voltage adaptively to prevent an over potential to the battery. First, the processor sets the DAC to the maximum voltage allowable (4.2 for single cell battery). It attempts to calibrate the unit by reading the charger voltage and comparing it to the set voltage. This results in an offset, which is then used to calculate the cutoff voltage of the battery (using the OCV method). This prevents the case of overcharging when the battery cutoff may never actually reach the desired/ideal 4.2V. This method also addresses battery aging, since its OCV voltage will slowly decrease with time, and having a decreased charge voltage will minimize the risk of plating metallic lithium inside the battery.

FIG. 1 is a flow diagram for a method of adaptively adjusting charger voltage to prevent over potential to a battery 100, under and embodiment. The method comprises setting a digital-to-analog converter of a charger to a set voltage 102. The set voltage is a maximum voltage allowable for a battery type. An output voltage of the charger is determined when the charger is operating at the set voltage 104. An offset voltage is determined by comparing the output voltage to the set voltage 106. A cutoff voltage of a battery is determined using the offset voltage and the open circuit voltage 108. The charger voltage adaptively adjusted in response to the cutoff voltage, and the adjusting prevents an over potential to the battery.

The second embodiment is the adaptive timer. If a battery is at 85% capacity, it is undesirable to keeping charging the battery as if the battery is fully discharged, since if the algorithm is a cutoff voltage based, and the cell is aged or has minor internal damage, cell stress to structural, phase change, or plating may occur.

A variable timer is set, based on the remaining capacity of the cell. The constant current phase timer of the charge algorithm is then set by the difference between full capacity and actual capacity of the cell, divided by the charge current. This yields in the time that the cell needs to complete constant current phase. This greatly reduce the time that a potentially damaged cell can be exposed to charge current and voltage. In addition, if the temperature of the cell exceeds a pre-defined upper limit (typically 40 degrees C.) or a lower limit (typically 0 deg C), the then charger circuit is opened, however, the timer is still allowed to run. This is designed to eventually flag a battery as failing if it continually faults hot or cold.

Under an embodiment a 5-year old 15 Amp-hour battery at 75% charge is charged at 1 Amp. Under an embodiment, it is attempted to charge this battery. The estimated time to charge a fully depleted battery would be 1.3*15=19.5 hours at a 1-amp charge rate. The adaptive timer would adjust this to 4.875 hours ([19.5−(19.5*0.75)]).

With a web interface, it is possible for offsite servers to examine cell voltages of batteries over millions of installed batteries. It is feasible for the server to analyze and determine cell open voltage cutoff values as the lithium battery ages.

The device can then request cutoff voltage from the server at large, allowing for longer battery lifetimes.

The same web technique could also be used to calculate the adaptive timer, to allow for tends to decrease or increase allowable charge from statistical battery data.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import, when used in this application, refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments and corresponding systems and methods is not intended to be exhaustive or to limit the systems and methods to the precise forms disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

The elements and acts of the various embodiments described above can be combined to provide further embodiments. These and other changes can be made to the embodiments and corresponding systems and methods in light of the above detailed description.

In general, in the following claims, the terms used should not be construed to limit the invention and corresponding systems and methods to the specific embodiments disclosed in the specification and the claims, but should be construed to include all systems that operate under the claims. Accordingly, the invention and corresponding systems and methods is not limited by the disclosure, but instead the scope is to be determined entirely by the claims.

While certain aspects of the systems and methods are presented below in certain claim forms, the inventors contemplate the various aspects of the systems and methods in any number of claim forms. Accordingly, the inventors reserve the right to add additional claims after filing the application to pursue such additional claim forms for other aspects of the systems and methods described herein.

What is claimed is:

1. A method comprising:
    setting a digital-to-analog converter of a charger to a set voltage, wherein the set voltage is a maximum voltage allowable for a battery type;
    determining an output voltage of the charger when the charger is operating at the set voltage;
    determining an offset voltage by comparing the output voltage to the set voltage;
    determining a cutoff voltage of a battery using the offset voltage and the open circuit voltage; and
    adjusting the charger voltage adaptively in response to the cutoff voltage, wherein the adjusting prevents an over potential to the battery.

* * * * *